United States Patent
Yang et al.

(10) Patent No.: US 11,088,912 B2
(45) Date of Patent: Aug. 10, 2021

(54) DISTRIBUTED FRAMEWORK FOR RESILIENT MACHINE-TO-MACHINE SYSTEM MANAGEMENT

(71) Applicant: Intel Corporation, Santa Clara, CA (US)

(72) Inventors: Shao-Wen Yang, San Jose, CA (US); Michael J. Nolan, Maynooth (IE); Ignacio J. Alvarez Martinez, Portland, OR (US); Robert Adams, Lake Oswego, OR (US); John Brady, Celbridge (IE); Mark Kelly, South Dublin (IE); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 16/062,108

(22) PCT Filed: Dec. 26, 2015

(86) PCT No.: PCT/US2015/000386
§ 371 (c)(1),
(2) Date: Jun. 14, 2018

(87) PCT Pub. No.: WO2017/111828
PCT Pub. Date: Jun. 29, 2017

(65) Prior Publication Data
US 2018/0375720 A1    Dec. 27, 2018

(51) Int. Cl.
*H04L 29/08*    (2006.01)
*H04W 4/70*    (2018.01)
(Continued)

(52) U.S. Cl.
CPC .......... *H04L 41/084* (2013.01); *G06N 20/00* (2019.01); *H04L 29/08* (2013.01);
(Continued)

(58) Field of Classification Search
CPC ... H04L 41/084; H04L 41/0866; H04L 29/08; H04L 67/12; H04L 69/40; H04W 4/70; H04W 8/005; G06N 20/00
(Continued)

(56) References Cited

U.S. PATENT DOCUMENTS

2010/0077078 A1   3/2010   Suit et al.
2013/0342355 A1*   12/2013   Lund ..................... G08C 17/02
                                             340/870.01
(Continued)

OTHER PUBLICATIONS

International Preliminary Report on Patentability in International Application No. PCT/US2015/000386, dated Jun. 26, 2018, 9 pages.
(Continued)

*Primary Examiner* — Tauqir Hussain
(74) *Attorney, Agent, or Firm* — Alliance IP, LLC

(57) ABSTRACT

Data is received describing a local model of a first device generated by the first device based on sensor readings at the first device and a global model is updated that is hosted remote from the first device based on the local model and modeling devices in a plurality of different asset taxonomies. A particular operating state affecting one or more of a set of devices deployed in a particular machine-to-machine network is detected and the particular machine-to-machine network is automatically reconfigured based on the global model.

23 Claims, 10 Drawing Sheets

(51) Int. Cl.
*H04L 12/24* (2006.01)
*H04L 29/14* (2006.01)
*G06N 20/00* (2019.01)
*H04W 8/00* (2009.01)

(52) U.S. Cl.
CPC .......... *H04L 41/0866* (2013.01); *H04L 67/12* (2013.01); *H04L 69/40* (2013.01); *H04W 4/70* (2018.02); *H04W 8/005* (2013.01)

(58) Field of Classification Search
USPC ........................................................ 709/223
See application file for complete search history.

(56) References Cited

U.S. PATENT DOCUMENTS

| | | |
|---|---|---|
| 2014/0053265 A1 | 2/2014 | Crowley |
| 2014/0180661 A1 | 6/2014 | Poston et al. |
| 2014/0221032 A1* | 8/2014 | Yang ........................ H04W 4/70 455/509 |
| 2014/0334313 A1 | 11/2014 | Nakamura |
| 2015/0319038 A1* | 11/2015 | Spencer ................. G06Q 10/06 370/254 |
| 2016/0135143 A1* | 5/2016 | Won ....................... H04W 12/08 370/312 |
| 2016/0261465 A1* | 9/2016 | Gupta ................. H04W 12/121 |
| 2016/0335550 A1* | 11/2016 | Achin ...................... G06N 5/02 |
| 2016/0357524 A1* | 12/2016 | Maluf ....................... G06F 8/34 |
| 2017/0075677 A1* | 3/2017 | Gross ....................... H04B 3/52 |
| 2019/0182122 A1* | 6/2019 | Kushnir .................. H04L 29/08 |
| 2019/0342159 A1* | 11/2019 | Witko ................. H04L 41/0806 |

OTHER PUBLICATIONS

International Search Report and Written Opinion in International Application No. PCT/US2015/000386, dated Aug. 24, 2016, 11 pages.
EPO; Extended European Search Report issued for EP Patent Application No. 15911527.8, dated Jun. 3, 2019; 12 pages.
Putera, Christian Antonia Lusiarta, et al; Incorporating OMA Lightweight M2M Protocol in IoT/M2M Standard Architecture; 2015 IEEE 2nd World Forum on Internet of Things; Dec. 2015; 6 pages.

* cited by examiner

DISTRIBUTED FRAMEWORK FOR RESILIENT MACHINE-TO-MACHINE SYSTEM MANAGEMENT

CROSS-REFERENCE TO RELATED APPLICATIONS

This application is a national stage application under 35 U.S.C. § 371 of PCT International Application Serial No. PCT/US2015/000386, filed on Dec. 26, 2015, and entitled DISTRIBUTED FRAMEWORK FOR RESILIENT MACHINE-TO-MACHINE SYSTEM MANAGEMENT. The disclosure of the prior application is considered part of and is hereby incorporated by reference in its entirety in the disclosure of this application.

TECHNICAL FIELD

This disclosure relates in general to the field of computer systems and, more particularly, to managing a machine-to-machine system.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1:
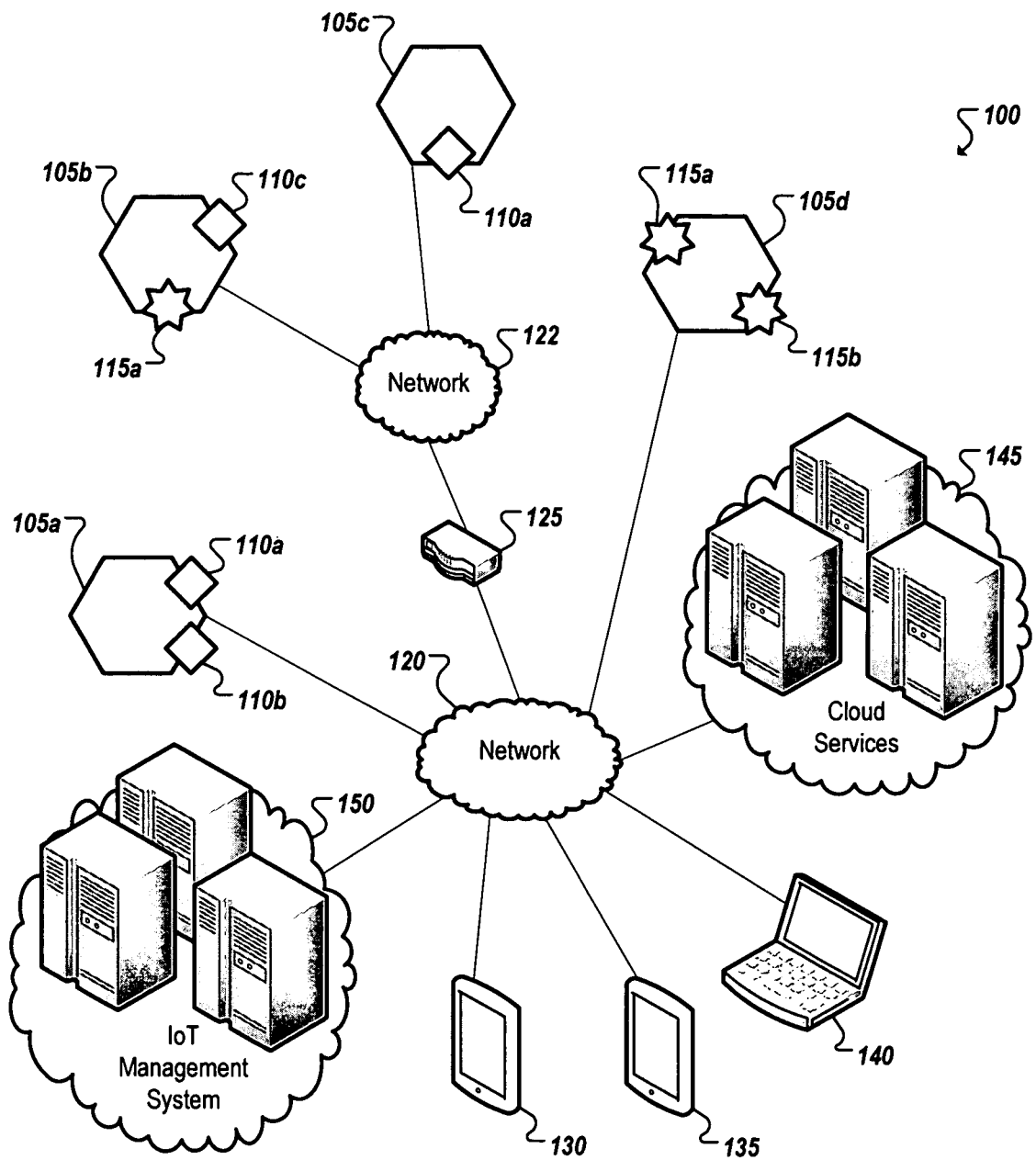
FIG. 1 illustrates an embodiment of a system including multiple sensor devices and an example management system.

FIG. 1 is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine, or Internet of Things (IoT) system or application. Further, each device (e.g., 105a-d) may additional include "internal" sensors configured to sense or monitor attributes of the device's own operation. Such internal sensors can measure device attributes such as processor usage, memory capacity, batter capacity, internal temperature (e.g., heating of processors, etc.), software security alerts, software errors and exceptions, among other attributes and events. The information derived from these internal sensors can serve to develop models from which the individual device can be proactively managed. Further, these device-centric models can be utilized, for instance, by an IoT management system 150 to develop global models that can be used to manage IoT systems that deploy the modeled devices (e.g., 105a-d) among other users and features.

Sensor configured for use in various M2M and IoT applications, or "application sensors," can be operable to detect, measure, and generate sensor data describing characteristics of the environment in which they reside, are mounted, or are in contact with. For instance, a given application sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, application sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform some kind of action to affect its environment. For instance, one or more of the devices (e.g., 105b, d) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

As noted above, application sensors 110a-c and actuators 115a-b provided on devices 105a-d can be incorporated in and/or embody an Internet of Things (IoT) or machine-to-machine (M2M) systems. IoT or M2M systems (sometimes user interchangeably herein) can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1, multiple IoT devices (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1, software-based IoT management platforms (e.g., 150) can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 120) or a mobile app for execution on a smart phone, tablet, smart watch, or other mobile device (e.g., 125, 130). For instance, a management system 150 can provision one or more deployed devices in an IoT system with application code in order to facilitate the IoT system.

In some cases, the application can make use of a dedicated or general purpose management utility or administrative tool allowing users to configure settings and policies to govern how the set of devices (e.g., 105a-d) are to operate when deployed in an IoT system. A management utility can also be used to select which devices are used with the application. In other cases, a dedicated IoT management application can be provided which can manage potentially multiple different IoT applications or systems. The IoT management utility, or system, may be hosted on a single system, such as a single server system (e.g., 150) or a single end-user device (e.g., 130, 135, 140). Alternatively, an IoT management system can be distributed across multiple hosting devices (e.g., 130, 135, 140, 150, etc.).

In some cases, applications can be programmed, or otherwise built or configured, utilizing interfaces of an IoT management system. In some cases, the interfaces can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). Further, IoT application systems built using the IoT management system can be sharable, in that a user can send data identifying the built system to another user, allowing the other user to simply port the abstracted system definition to the other user's environment (even when the combination of device models is different from that of the original user's system).

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 145). For instance, the IoT system can connect to a remote service over one or more networks 120. In some cases, the remote service can, itself, be considered an asset of an IoT application and system. Data received by a remotely-hosted service can be consumed by the governing IoT application and/or one or more of the component IoT devices to cause one or more results or actions to be performed, among other examples.

One or more networks (e.g., 120, 122) can facilitate communication between IoT devices (e.g., 105*a-d*), end user devices (e.g., 130, 135, 140), and other systems (e.g., 125, 140, 145) utilized to implement and manage IoT applications in an environment. Such networks can include wired and/or wireless local networks, public networks, wide area networks, broadband cellular networks, the Internet, and the like. For instance, in some implementations, one or more gateway devices (e.g., 125) can be utilized to facilitate communication with one or more devices (e.g., 105*b-c*) within a given IoT system. For instance, a gateway can be utilized to extend the geographical reach of an IoT system implementation, to provide a mechanism to communicate with devices (e.g., 105*b*) which possess limited or proprietary communications capabilities, or form sub-groups of devices within an IoT system deployment.

In general, "servers," "clients," "computing devices," "network elements," "hosts," "system-type system entities," "user devices," "sensor devices," and "systems" (e.g., 105*a-d*, 125, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

In some implementations, a system can be provided with improved IoT management functionality to simplify deployment of IoT devices through asset abstraction to significantly reduce the human touch points during deployment and redeployment. For instance, IoT management and applications can adopt a paradigm where, instead of referencing and being programmed to interoperate with specific IoT devices, the system can refer to abstracted classes, or taxonomies, of IoT devices (or "assets"). Asset abstraction can be leveraged to automatically configure a deployed IoT system with minimal human intervention. Indeed, in some instances, configuration of the system can progress without a user having to actually specify which device to use. Instead, a deployment policy can be used instead by the system to automatically select and configure at least a portion of the devices within the system. Further, asset abstraction can facilitate addressing the challenge of portability of IoT applications, which has traditionally limited the general scalability and resiliency of IoT applications.

Asset abstraction can be coupled with automated asset binding, in some cases, to eliminate the necessity of including a device/asset's unique ID in an IoT application or management program. Asset discovery provided with the application or management program can provide an effective means for specifying policy and confining the scope of asset binding. Through the combination of asset discovery, asset abstraction, and asset binding makes IoT applications portable, reusable and sharable.

In some implementations, with asset abstraction, assets are treated indifferently as long they fall into a same category in the taxonomy, e.g., occupancy sensing, image capture, computation, etc. An IoT application, consequently, can be made portable, reusable and sharable, as it can be written and stored in a way that specifies only requirements (e.g., references to abstracted asset taxonomies providing the requirements) without specifying the precise identity (or catalogue of identities) of compatible devices meant to provide these requirements. Asset discovery allows all available resources to be searched to detect those meeting the requirements and further selected, in some instances, on the basis of customizable or policy-based criteria.

In addition to facilitating write-one-run-everywhere portability of IoT applications, an improved IoT management framework can include functionality to improve the resiliency of IoT systems deployed utilizing the management framework. IoT systems may be expected to provide high levels of reliability and resiliency. Indeed, such characteristics can be critical in some implementations, where even incremental failure of the IoT system results in costly damages or even potential loss of life. Providing such reliability and resilience can be challenging in IoT systems, given the number and diversity of devices included in the system. Particularly in large IoT systems (with more than dozens or hundreds of devices), managing the health and reliability of each device can be prohibitively complex for human managers. Sustained failure of a single device can potentially result in failure of the entire system. Managing a large number of potential points of failure can be daunting. Indeed, given the potential variety of devices (and device manufacturers), some devices can be expected to have higher levels of native resiliency and reliability than others. Further, as many devices may be battery powered, the trustworthiness of the various power sources can also be a factor in how individual devices, and the collective IoT system, perform.

In one implementation, a scalable system management framework for resilient Internet of Things (IOT) systems is provided that facilitates the ability of IOT applications or services to dynamically adapt to changes in the system (e.g., battery level change, microprocessor idle time, network topology, device workload change, etc.) and do so in a distributed and cost efficient manner. Further, the system management framework can promote system resiliency at both the system and device level by enabling automated self-healing and self-optimizing of the system. Self-healing can be enabled, for instance, by continuously collecting operating status of individual component deices and causing them to restart or reset them when appropriate. Such self-healing actions can take place at the device level. Self-healing can involve the performance of tasks and processes at a device to return the device to its healthy operating state. Further, given that operating status is collected in the background, the framework can utilize machine learning techniques to derive meaning from the data and learn patterns within the system. Models can be developed from the based on this learning, which can be used to prescribe an action to restart or reconfigure components individually or redeploy all or a portion of the system as a whole. Reconfiguring can refer to making operational changes to applications/services running on a given device within an IoT system. Redeployment can refer to moving applications/services from the device to other nearby, but compatible devices (e.g., replacing devices in the IoT system with other compatible devices, etc.)

Reliability of an IoT system can refer to the reliability of the system delivering a desired result or outcome in the face of intrinsic influencing factors. System resiliency can refer to the ability of a system to maintain acceptable levels of service despite run-time challenges such as hardware and software failures, communication outages, security threats, or other extrinsic issues. Resilience may contemplate the acceptability of the system maintaining a degraded, but acceptable level of service in some circumstances.

As the scale and dynamics of IoT systems become more difficult to manage, the resilience of IOT systems becomes increasingly important, particularly in implementations seeking to roll out economically viable IoT solutions at scale. Many conventional IoT solutions have proven vulnerable to real world conditions. For instance, the static nature and the unreliable operation of some current IoT technologies in dynamic and challenging operating environments has made some IoT deployments cost prohibitive (thereby discouraging, at some level, future attempts to adopt similar systems, in some cases).

An improved management framework can be implemented to provide the use of telemetry to remotely monitor physical conditions of each device (e.g., resource utilization, environmental sensor observations and instruments (e.g., of the device's sensors and actuators)) to insure the maintenance of a proper working environment for the devices. Such monitoring can make possible self-healing and self-optimizing in some instances. Further, through resource abstraction (e.g., supporting a taxonomy framework abstracting resources away from devices), devices within a particular class, or taxonomy, can be treated indifferently in the application and system. Accordingly, in such implementations, IOT applications can be redeployed automatically as they are written and stored to specify only resource requirements (by corresponding taxonomy) without requiring the specific identity information of each deployed device. Further, machine learning tasks utilized to enhance resiliency and reliability in the system can be distributed, such that at least a portion of the tasks are handled by the deployed devices using data local to the device. This can facilitate scaling up of systems utilizing the improved management framework.

Figure 2:
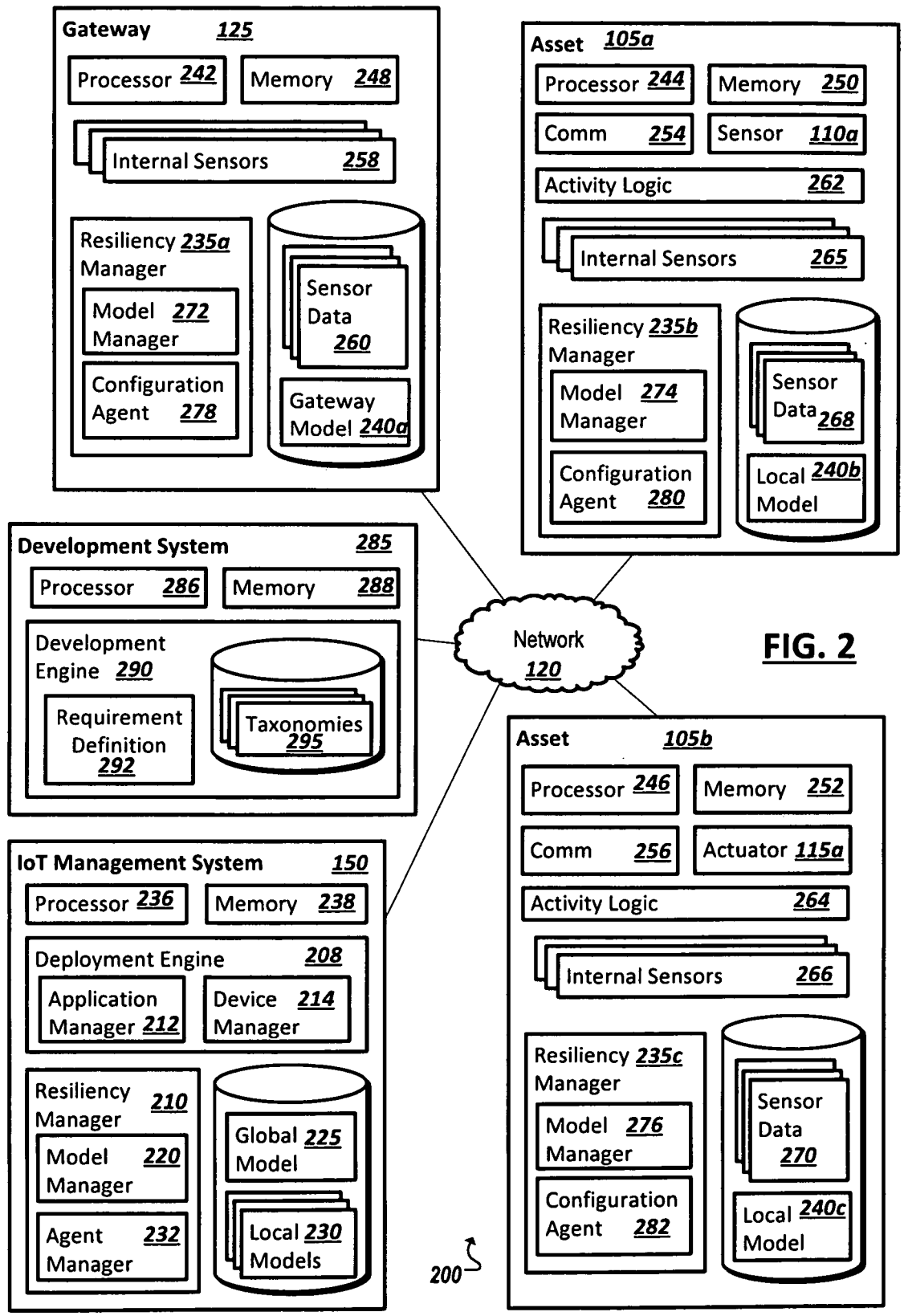
FIG. 2 illustrates an embodiment of a system including an example management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices, or assets, (e.g., 105*a-b*) capable of being used in a variety of different IoT applications. Some of the assets may communicate within an IoT system, or machine-to-machine network, using a gateway 125. Assets (e.g., 105*a-b*, 125) for use in the IoT system can be coupled to an IoT management system 150, which can provide services to assist in maintaining reliability and resiliency of IoT systems implemented using the assets. Further, a development system 205 can be provided, in some implementations, for use in developing IoT applications utilizing asset abstraction.

In the particular example of FIG. 2, the management system 150 is implemented on a server system remote from at least some of the IoT assets (e.g., 105*a-b*, 125). The management system can include one or more computer processor apparatus (e.g., 206) and one or more memory elements (e.g., 208), as well as one or more components implemented in hardware and/or software. For instance, the management system 150 may include a deployment engine 208 and system resiliency manager 210. The deployment engine 208 can possess functionality for automating and managing deployments of IoT assets to implement an IoT system (e.g., in accordance with a corresponding IoT application, or workload). For instance, the deployment engine 208 can include an application manager 212 to determine, for one or more corresponding applications (hosted by the management system 150, a user device (not pictured), or other system), a set of assets to deploy in satisfaction of asset requirements of the application. Rather than identifying particular assets to deploy (e.g., at the device or device identifier level), the applications can be coded to reference assets abstractly by taxonomy. A set of device abstractions, represented by the taxonomies, can be specified in the application code corresponding to the asset requirements of the application, from which the management system 150 can deploy specific devices that qualify as members, or instances, of the specified taxonomies. A device manager 214 can be provided to interface with devices discovered or selected for deployment by the application manager 212. Additionally, the device manager 210 can be utilized in re-deployments of the system, for instance, in response to a determination by system resiliency manager 210.

In some implementations, deployment engine 208 can include functionality (e.g., in application manager 212) for determining which IoT devices are within range of each other, or within range of a particular device (e.g., a gateway (e.g., 125) or a user endpoint device) utilized to administer or facilitate the IoT system. In some implementations, the deployment engine 208 can make use of the wireless or other network communication capabilities to attempt to communicate with devices within a particular radius. For instance, devices within range of a WiFi or Bluetooth signal emitted from an administrating client device or gateway (e.g., 125) can be detected. Additional attributes, or discovery criteria, can be considered by the deployment engine 208 when determining whether a device is suitable for inclusion in a listing of devices for a given system or application. For instance, the asset discovery module 220 may attempt to identify, not only that it is capable of contacting a particular asset, but may also determine assets such as physical location, semantic location, temporal correlation, movement of the device (e.g., is it moving in the same direction and/or rate as the administrating device), permissions or access level requirements of the device, among other characteristics. As an example, in order to deploy smart lighting control for every room in a home- or office-like environment, an application may be deployed in a "per room basis." Accordingly, the asset discovery module 220 can determine a listing of devices that are identified (e.g., through a geofence or semantic location data reported by the device) as within a particular room (despite the asset discovery module 220 being able to communicate with and detect other devices falling outside the desired semantic location). Conditions for discovery can be defined in the IoT application (e.g., 205) itself or may be configurable such that a user can custom-define at least some of the conditions. Additionally, in some examples, different discovery conditions can be defined for different asset types (or taxonomies), as appropriate. For instance, a remote service may be a perfectly acceptable asset to utilize for one asset taxonomy used in an application, where the proximity of the service's host can be ignored, while proximity may be (e.g., in the very same system) an important factor for other types of assets, such as a sensor, actuator, etc.

A deployment engine 208 can also include an asset abstraction logic to recognize defined mappings between specific IoT devices or, more generally, specific functionality that may be included in any one of a variety of present or future IoT devices, and a collection of defined taxonomies, or device abstractions corresponding to such functionality. The deployment engine 208 can determine, for each asset discovered during asset discovery (e.g., according to one or more discovery criteria), a respective asset abstraction, or taxonomy, to which the asset "belongs". Each taxonomy can correspond to a functional capability of an asset. Assets known or determined to possess the capability can be grouped within the corresponding taxonomy. Some multi-function assets may be determined to belong to multiple of the taxonomies. A device manager (e.g., 214), in some instances, can be utilized to query the assets or otherwise obtain information regarding the functionality of the assets. From the functionality identified for the asset (or from a pre-determined mapping of the asset to a particular taxonomy), the deployment engine 208 can determine which abstraction taxonomies to associate with each asset.

Asset abstraction can allow the application (and the management system 150) to treat every asset falling within a given taxonomy as simply an instance of that taxonomy. Data can defined an asset abstraction taxonomy framework (defined on an application-, system-, or universal-basis) that abstracts away the precise device into taxonomies including higher- and lower-level taxonomies for sensing, actuating, computation, storage, and other taxonomies. Such data can be referenced by the deployment engine 208 when making determinations regarding how to associate a given device with a taxonomy. With asset abstraction, assets are treated indifferently as long they fall into a same category in the taxonomy, e.g., occupancy sensing.

A deployment engine 208 can also include asset binding logic, which can select, from the discovered assets, which assets to deploy for a system (e.g., based on a workload of a particular application). In some cases, upon selecting an asset, the deployment engine 208 (e.g., using device manager 214) can cause the corresponding asset to be configured for use with an application and/or other assets in the system. This can involve provisioning the asset with corresponding code (e.g., to allow it to communicate and interoperate with the application and/or other assets), logging in, unlocking, or otherwise enabling the asset, sending session data to or requesting a session with the asset, among other examples. In cases where multiple assets of the same taxonomy have been identified (and exceed a maximum desired number of instances of the taxonomy defined for the system or application), the deployment engine 208 can additionally assess which of the assets is the best fit. For instance, the deployment engine 208 can define criteria indicating desirable attributes of assets utilized in an application. These criteria can be global criteria, applying to instances of every taxonomy, or can be taxonomy-specific (i.e., only applying to decisions between assets within the same taxonomy). Asset binding can provision the assets specified by an IoT application for deployment automatically (before or during runtime). Portions of the application can be distributed on one or more of the assets in some implementations. Once assets are provisioned, the deployed assets can be used collectively for achieving the goals and functionality designed for the application.

A deployment engine 208 can additionally provide functionality to allow users define settings to be applied to the selected asset taxonomies (or requirements) of an application. A variety of different settings can be provided depending on the collection of assets to be used by the application and the overall objectives of the application. Default setting values can be defined and further tools can be provided to allow users to define their own values for the settings. What settings constitute the "ideal" may subjective and involve some tinkering by the user. When the user is satisfied with the settings, the user may save the settings as a configuration. In some implementations, these configurations can be stored locally (e.g., at device 130) or on the cloud. Configuration data can be generated from which the settings are automatically readopted at runtime by the deployment engine 208, each time the application is to deploy the assets it discovers. Consequently, while specific devices are loosely tied to the user's instance of the application (as they are abstracted away), settings can be strongly tied to the user or an application, such that the settings can be applied between environments, including environments with different sets of assets that are bound to the application at runtime. Regardless of the specific device identifiers or implementations selected to satisfy the abstracted asset requirements of the application, the same settings can be applied (e.g., as the settings, too, are directed to the abstractions of the assets (i.e., rather than specific assets)).

The deployment engine 208 can be used in runtime to cause the settings to be applied at the IoT devices (assets) selected for deployment within a system. The device manager 208 may include logic enabling the deployment engine 208 to communicate with a variety of different devices using a variety of different protocols. Further, the deployment engine 208 can send instructions to each of the selected assets for deployment to prompt each asset to adjust settings in accordance with those defined for the asset taxonomy in the setting configuration defined by the user.

In one example, a system resiliency manager 210 can be provided with machine learning functionality (e.g., in global model manager 220) to assess performance metrics of the various IoT assets under its purvey to develop a model of the universe of IoT assets and/or taxonomies it may interface with to deploy and manage deployment of an IoT system. The global model 225 can include component models modeling each of a collection of taxonomies, or device abstractions, as well as model specific one or more of the devices known to the management system 150 and falling within one or more of the taxonomies. The global model 255 can be derived from or updated based on copies of local models 230 maintained locally at IoT assets (e.g., 105a-b, 125) and modeling the corresponding asset based on data collected at and describing the asset. An agent manager 232 can be provided to interface with agents (e.g., local resiliency managers (e.g., 235a-c)) local to the various assets (e.g., 105a-b, 125). The agent manager 232 can receive updated local model data identifying changes to the local models (e.g., 240a-c) reported by corresponding resiliency managers (e.g., 235a-c). In addition to updating the global model 225 from reported local model 230 updates, the global model 225 can be used to update the distributed local models (e.g., 240a-c). For instance, each of the local models (e.g., 240a-c) can be initially derived from information in the global model 225. As new information is obtained at each asset (e.g., 105a-b, 125) and their corresponding local models updated to reflect the new information, the assets' agents can pass this information up to the global model manager 220. Likewise, as updates to the global model affect at least some of the local models, the agent manager 232 can indicate these updates to the local agents (e.g., resiliency managers (e.g., 235a-c)) to cause their local models (e.g., 240a-c) to be also updated to reflect the changes. For instance, different instances of the same taxonomy may each maintain a device-specific local model tied to a taxonomy model maintained in the global model. A change to a local model by one device in the taxonomy may cause the model for the taxonomy to be changed (e.g., by global model manager 220), which may affect the local models of other devices in the taxonomy. In some cases, multiple instances of the same device may report local model information to the global model manager 220, and the aggregate findings in these multiple local models modeling the same device may be utilized to improve the modeling of the device (e.g., as reflected in the global model). The improved information (e.g., gleaned from more data points for the device) can be shared with the corresponding local models of the multiple instances of the particular device, among other examples.

Each of the assets (e.g., 105a-b, 125) can include one or more processing apparatus (e.g., 242, 244, 246), one or more memory elements (e.g., 248, 250, 252), and hardware and/or software implementing one or more logical components. For instance, each asset can include one or more communications modules (e.g., 254, 256) to facilitate communication with other assets and/or the management system 150 utilizing one or more different technologies (e.g., WiFi, Bluetooth, ZigBee, Ethernet, etc.).

One or more gateway assets 125 can be provided through which all or a portion of the deployed assets in an environment can communicate and/or connect to online resources and assets (e.g., cloud-based computing assets and services). The gateway 125, in addition to its traditional functionality, can include an instance of a resiliency manager 235a which can be used to manage a local model (e.g., gateway model 240a) modeling the operation and contribution of the gateway to IoT systems. Internal sensors 258 can be provided within the gateway to monitor various aspects of the gateway's performance and health. Such internal sensors can measure such characteristics as processing capacity, memory capacity, processor temperature, security, battery power, network connectivity (e.g., connection status and speed), among other examples. These sensors, in some cases, can be natively disposed on various components of the gateway (e.g., temperature sensors on cores of the processor 242, memory managers, etc.). The various internal sensors 258 can additionally generate sensor data 260 that can describe the characteristics and events detected by the internal sensors 258. The machine learning logic of the resiliency manager 235a can process this information within the context of the local model 240a to determine whether to modify the local model 240a. In the case of a gateway (e.g., 125), the local model 240a may not only model the internal characteristics and performance tendencies of the gateway 125, but also model the types of interactions it has during operation with the various assets. In some cases, the gateway 125 can be considered a level of aggregation above the device level, and the local model of the gateway 125 can, in some case, model the devices (e.g., 105a-b) to which it connects. Indeed, in some cases, gateway resiliency manager 235a can receive data reported from the devices to which it connects indicating changes to the local models (e.g., 240a-b) of these devices (e.g., 105a-b) to cause the gateway local model (e.g., 240c) to be correspondingly modified, among other examples.

Generally, IoT assets (e.g., 150a-b) can possess unique hardware and other logic (e.g., 110a, 115a, 262, 264, etc.) to realize the intended functionality of the device. For instance, devices may be provided with such resources as sensors of varying types (e.g., 110a), actuators (e.g., 115a) of varying types, energy modules (e.g., batteries, solar cells, etc.), computing resources (e.g., through a respective processor and/or software logic), security features, data storage, and other resources. Further, additional logic (e.g., 262, 264) can be provided through which the respective device (e.g., 105a-b) processes data generated or received by the device, generates communications, controls sensors and actuators of the device, generates outcomes, related to the device's function(s).

Like gateway device 125, IoT assets 105a-b in addition to its traditional functionality, can additionally possess an instance of a resiliency manager 235a which can be used to manage a local model (e.g., 240b-c) modeling the operation and contribution of the respective assets to IoT systems in which they are deployed. Internal sensors (e.g., 264, 265) can likewise be provided within the assets 105a-b to monitor and generate sensor data (e.g., 268, 270) describing characteristics of the asset's respective operation (e.g., processor attributes, memory attributes, power attributes, communications attributes, etc.) The machine learning logic of the corresponding resiliency manager (e.g., 235b-c) can process this information within the context of the local model 240a to learn the tendencies and patterns of the device's operation, as well as how the various metrics (collected by the internal sensors 265, 266) indicate or correlate to certain tendencies or events at the device. These attributes and patterns can be documented within the corresponding local model (e.g. 240b-c). A model can represent the outcome of a solver (e.g., a model learning tool). For example, supervised learning algorithms take as input labeled data to generate models. The models are then used by the algorithm for predicting the labels of unlabeled data.

Each instance of a local resiliency manager, or agent (e.g., 235a-c), can include functionality to not only learn from corresponding locally collected sensor data (e.g., 260, 268, 270), but can also update the local model in accordance with the learning (e.g., using local model manager logic (e.g., 272, 274, 276)). The local resiliency managers (e.g., 235a-c) can additionally interface with a global resiliency manager (e.g., 210). The local resiliency managers (e.g., 235a-c) can send data to the global resiliency manager 210 reporting determined changes to their local models (e.g., 240a-c). Local model updates can be determined and sent (e.g., at varying intervals) in lieu of sending the raw locally-collected sensor data (e.g., 268, 270), to free up valuable bandwidth of the IoT assets and provide scalability of the management system 150, among other example advantages. Additionally, local resiliency managers (e.g., 235a-c) can receive updates to be applied to the local models (e.g., 240a-c) based on updates made to the global model 225 by the global resiliency manager 210. In some cases, the global resiliency manager 210 can determine that a particular update to the global model 225 affects particular local models (e.g., 240a-c) hosted by distributed local resiliency managers and only send updates to those local models affected by the change to the global model 225.

Local resiliency managers (e.g., 235a-c) can additionally include configuration agents (e.g., 278, 280, 282) to perform self-healing and self-reconfiguration tasks on the corresponding device (e.g., 125, 105a-b) based on information within the device's local model (e.g., 240a-c). For instance, patterns can be defined within the local model (e.g., 240a-c) and the resiliency manager (e.g., 235a-c) can predict or identify various events based on the patterns. In response to the events (or predictions) the configuration agent (e.g., 278, 280, 282) can perform a self-healing or-reconfiguration task on the device to prevent or address an outage involving all or a portion of the device's IoT functionality. Likewise, the global resiliency manager 210 can utilize the global model to identify and forecast events affecting a portion of a broader IoT system (e.g., two or more assets) and can utilize functionality of the IoT management system 150 to restart or reconfigure two or more devices in a system (e.g., using device manager 214), or to re-deploy one or more assets of the system (e.g., leveraging asset abstraction using deployment engine 208). Accordingly, a scalable framework can be implemented to realize IoT system reliability and resiliency at both the device and system level. Indeed, the framework can distribute learning tasks, model generation, and data gathering among a centralized manager and multiple local manager (i.e., local to assets). In some cases, this distribution can be hierarchical (e.g., device-gateway-management system, etc.), among other features.

In addition to providing for system resiliency, in some implementations, a development system 285 can be provided, supporting the development of IoT applications (and thereby also, IoT systems and IoT system management) based on asset abstraction. As noted above, asset abstraction can assist not only in easing the deployment of a system, but also in the programming of IoT applications. For instance, a development system 285 can include one or more processors 286 and one or more memory elements 288 utilized to implement a development engine 290. The development engine 290 can provide traditional programming tools for use in coding an application. In some instances, the development engine 290 can instead, or additionally, include declarative programming tools allowing users, including novice programmers, to specify generalized or abstracted requirements of the IoT application (e.g., using requirement definition component 292), expressed as collections of asset taxonomies. The user may additional declare relationships between two or more of the selected taxonomies to indicate input-output, sensor-actuator, or other relationships that are to be automatically defined in corresponding application code. In either implementation, the development engine 290 can allow IoT applications (for which devices 105a-b, 125 may be deployed and managed) to be developed using asset abstractions (e.g., based on taxonomy definitions 295). In some implementations, functionality of a development system can be incorporated in an IoT management system (e.g., 150), among other example implementations.

Figure 3:
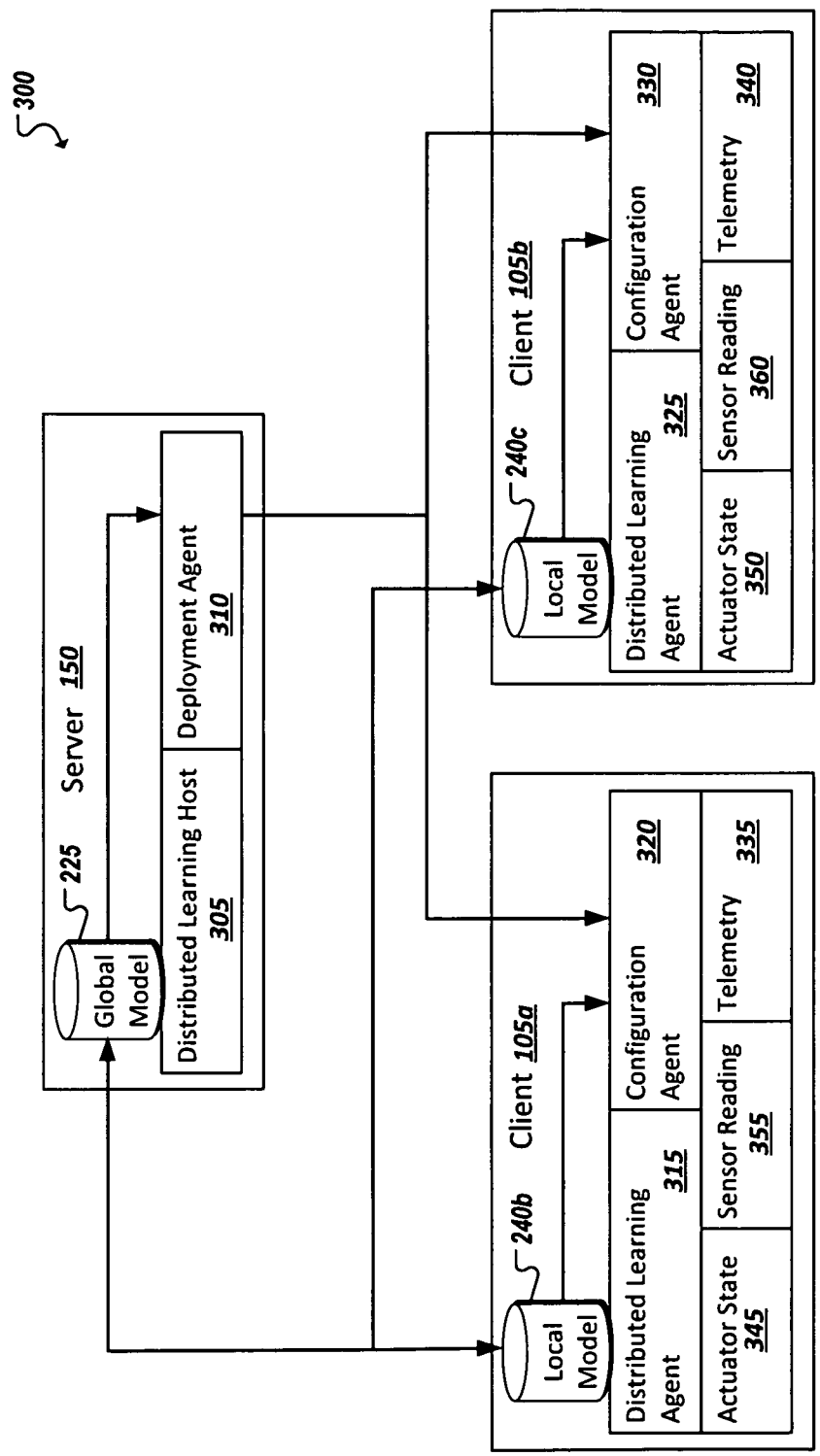
FIG. 3 is a simplified block diagram representing interactions between client assets hosting local models and a management system server hosting a global model.

Turning to FIG. 3, a simplified block diagram 300 is shown representing general interactions between client devices (e.g., 105a-b)) hosting local resiliency management logic (e.g., 315, 320, 325, 330) and local models (e.g., 240b-c) modeling the local client devices (e.g., 105a-b), and a centralized management system server 150. The management system 150 can host a global model 225 and include global resiliency management logic (e.g., 305, 310). As shown, each local model 240b-c can be provided to support updates of the global model 225. Updates to the global model, which affect a particular local model 240b-c, can be likewise propagated "down" to update the local model. Local resiliency management logic, such as configuration agents 320, 330 can be utilized to allow the device to perform self-healing with data collected locally at the device (e.g., using telemetry logic (e.g., 335, 340), including internal sensors and sensor data processing). Given that data is collected and stored locally, "out-of-service" resources or devices can be determined or predicted (e.g., using the local model), such as may be caused by insufficient battery power, hardware failure, a software bug, etc., among other events or conditions. In some cases, an event may indicate that the IoT device operates in a resource-constrained mode. In response, self-healing actions can be taken (e.g., using configuration agent 320, 330), such as a restart to restart non-responsive components, applications or services, or a reset and start to reset the device and restart non-responsive components. For instance, telemetry logic 335, 340 may indicate that a particular actuator (e.g., 345, 350) or sensor (e.g., 355, 360) is out of service, among other examples. In some cases, rather than relying on an outside source for assistance in reestablishing an acceptable state of operation, the configuration agent (e.g., 320, 330) can consult the local model 240b-c to identify a last known good configuration and can cause the device to be reconfigured to apply this alternative configuration. In some cases, the configuration agent can boot to a known good read-only partition, which has functional communication or other features, which may allow the device to access external resources to complete or supplement the self-healing tasks. Other tasks triggered by the configuration agent can include operating system-level self-healing tasks, such as deploying a counter-measure using a security software tool, causing an automated message (e.g., email, text message, phone call) to be made to a user, among other examples.

As noted above, each client device (e.g., 105a-b) may be equipped with machine learning logic to access data of internal sensors (and, in some cases, the data of actuators (e.g., 345, 350) and sensors (e.g., 355, 366) stored locally at the device (e.g., 105a-b)) to log operating status of the device and derive updates to its local model (e.g., 240b-c) utilizing its machine learning programming. In some cases, the local model can be generated "from scratch" using the client's local model manager, while in other cases, the client may be given an a priori model, based on the global model, for bootstrapping. Locally learned models (e.g., 240b-c) can be provided (in lieu of continuously reported raw data) to the global model manager at certain intervals (e.g., windows where computational and communications activity is low at the device (e.g., 105a-b) for model reinforcement. The global model manager (at server 150) can utilize the received local models to update its global model 225. In some cases, a device (e.g., 105*a-b*) may possess substantially lower processing capabilities than the management system's 150 hardware, and the global model manager (and its machine learning logic 305) may derive additional insights from the local models to build a "deeper" improved version of the local model (i.e., utilizing the server's enhanced processing capabilities). The merged global model 225 can likewise be used to update or improve the local models (e.g., 240*b-c*) by synchronizing the local models to updates or new insights derived and recorded in the global model 225. In one example embodiment, an instantiation of Alternating Direction Method of Multipliers (ADMM) using Support Vector Machines (SVMs) for classification is used.

In some cases, self-optimization can be facilitated through prescriptive analytics, which can prescribe an action so that the framework can utilize modeled information and act. The objective may include power efficiency, throughput, latency, bandwidth, or another goal. Prescriptive analytics in a distributed learning framework can be used to reason about operating status and determine whether or not the status is optimal. The resiliency and reliability support logic at the device, gateway, or management system can be then be used to take action to restore the system to its optimal state where possible. For instance, configuration agents (e.g., 320, 330) can locally reconfigure its device's intrinsic parameters for local optimality based on its respective local model. For example, presuming a system is optimized for throughput, when a device is about to run out of local memory, a device may reduce its concurrency for improved throughput. Component parameters may be individually re-configurable to behave differently depending on the constrained mode the device is determined to be operating in (e.g., as determined from operating patterns defined within the local model). In other words, reconfiguration decisions made at the local device can be predictive based on local learning.

At a system level, a management system deployment agent 310 (e.g., included in a deployment engine) can similarly identify and forecast system-level issues from the global model and observations of current system attributes. For instance, to resolve an issue, the management system can redeploy a system by redistributing IoT application components across clients. For example, presuming a system is optimized for throughput, when a client is about to run out of memory, a component may be redeployed to another client for improved throughput. In other words, the management system 150 can dynamically replace assets with other assets (e.g., from the same asset abstraction or taxonomy) redeployed in response to address issues in the system (e.g., determined from the global model 225). Such automated and responsive asset redeployment can powerfully leverage the paradigm of asset abstraction utilized by IoT applications managed by the management system 150

Figure 4:
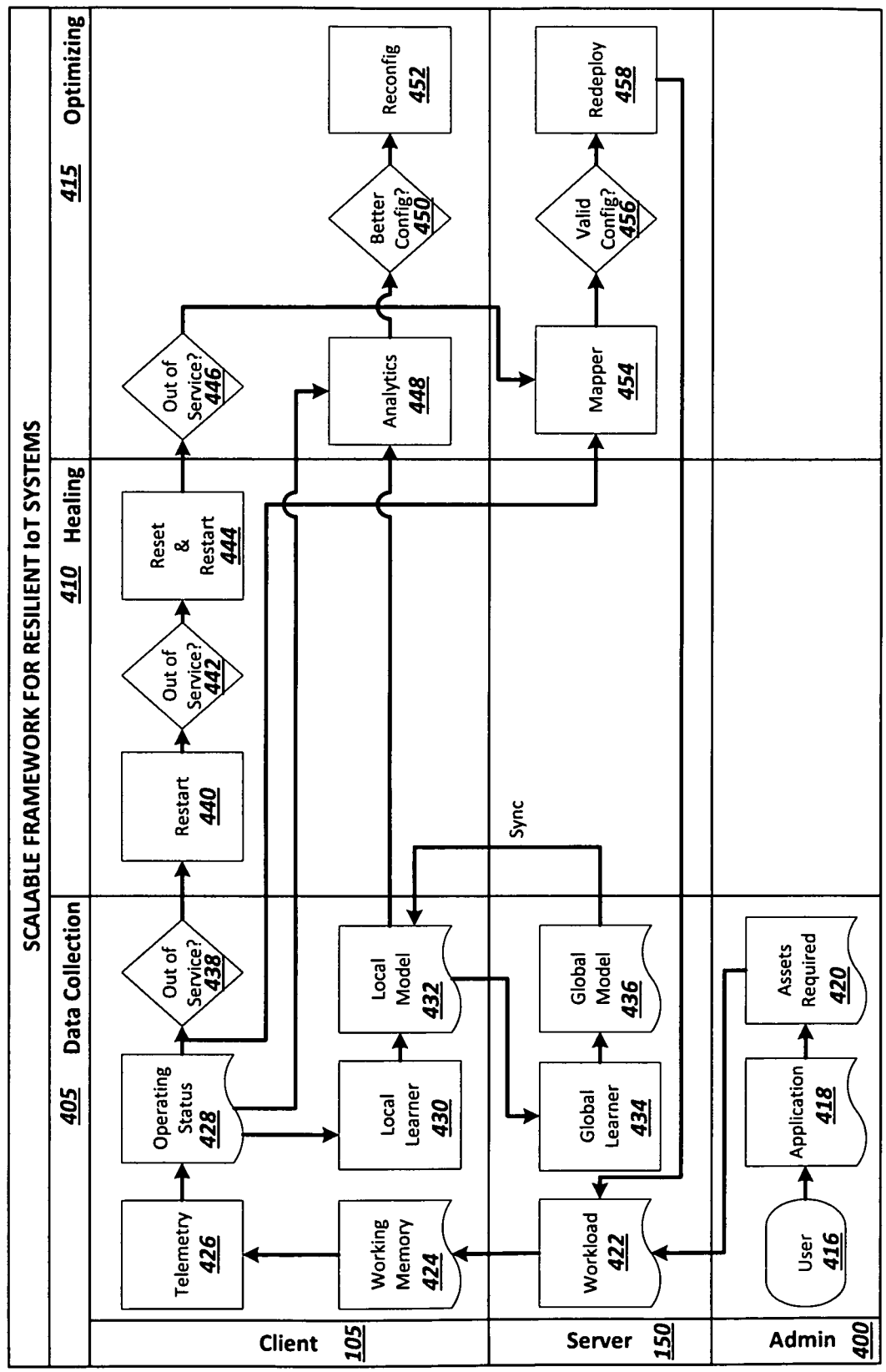
FIG. 4 is a flowchart illustrating an example architecture of a distributed IoT resiliency framework.

Turning to FIG. 4, a flowchart is shown illustrating one implementation of a scalable framework for resilient IOT systems. Resiliency can be facilitated through data collection 405, self-healing 410, and optimization/redeployment 415 modes. In this example, an administrative tool 400 can be provided to support a user interface through which an end user 416 can interact with, configure, and launch an IoT application 418. For instance, a user 416 can select or even build an IoT application 418 (e.g., utilizing declarative programming leveraging asset abstraction to simplify the technical demands of the application's programming) to define a set of required assets 420 (e.g., as specified in a set of taxonomies referenced in the application 418). The administrative tool 400 can interface with the management system 150 to provide the resource requirements of an application from which the management system 150 is to develop a workflow 422 for the deployment. In some instances, the management system 150 can provision code of the application 418 (as defined in workload 422) in working memory 424 of the client IoT asset 105. The IoT asset 105 can be deployed in the IoT system and utilize the provisioned code and apply settings specified for the application by the management system 105.

During operation of an asset 105 in an IoT system governed by application 418, telemetry logic 426 of the asset 105 can collect data generated by various sensors provisioned within the asset 105 describing performance attributes and state of the asset 105 during operation. Operating status 428 and status changes can be determined from the sensor data (e.g., by machine learning logic of the asset 105). Operating status 428 can be fed to the learning logic 430 further to build, refine, and otherwise manage a local model 432 modeling the asset 105. As noted above, the asset 105 can contribute to the generation and maintenance of an up-to-date global model 436 modeling a universe of potential IoT assets (including asset 105) that may be managed and deployed by a management system 150 in an IoT system. For instance, global machine learning logic 434 can accept periodic local model updates from a variety of different assets (and even different instances of the same device) to iteratively refine the global model 436. Similarly, the local model 432 can be periodically synchronized to the global model 436 to cause updates to the global model 436 (e.g., prompted from other local model updates) to be reflected at the local model 432.

Operating status 428 determined at the asset 105 from locally collected telemetry information (during data collection 405) can additionally be used to prompt one or more self-healing (410) or optimization (415) tasks. For instance, if an out-of-service operating status is determined (e.g., 438), a restart 440 of one or more components of the asset 105 (or the entire asset 105) may be used to attempt to address the out of service condition. Following the restart attempt 440, the asset can re-assess to determine (at 442) whether the out of service condition has been resolved by the restart 440. If not, in some implementations, the asset 105 can perform an additional self-healing task such as performing a reset and start 444. The status of the asset can again be reassess (e.g., at 446) to determine if the reset and start 444 resolved the out-of-service operating status. If not, handling of the issue, or outage, can be passed to the management system 150, for instance, to initiate a redeployment of the IoT system to replace the asset 105 with another asset of the same taxonomy.

Operating status 428 can also be utilized to trigger device and system optimization tasks 415. For instance, the determined operating status 428 can be passed to analytics logic 448 local to the asset (e.g., implemented in a resiliency manager of the asset) to assess the current operating status 428 in light of the intelligence encapsulated in local model 432. In some instances, an opportunity can be identified (at 450) (e.g., from the local model 432, based on the operating status 428) to reconfigure 452 intrinsic parameters of the local asset 105 to a different preferable configuration. As one example, microprocessors' inlet temperature changes may lead to increase of fan speed, which can, in turn, affect the vibration of the fan motor and may lead to slowing down the factory pipeline. Indeed, room temperature/moisture changes may lead to change of fan speed of an A/C.

An out-of-service condition (e.g., at 446) or other operating status 428 detected at a particular asset (e.g., 105) can prompt remediation at the system level by the management system 150. For instance, assets can detect issues in real time and initiate self-healing and reconfiguration operations. Assets can also escalate issues (e.g., out-of-service conditions) detected in real-time at the asset to prompt the management system to initiate a wider reconfiguration or redeployment (e.g., in response to self-healing or other tasks performed at the asset failing to resolve the issue(s)). For instance, a mapper 454 can assess each of the implemented instances of the abstracted asset requirements 420 of the application 415 during operation of the system (e.g., based on operating status 428 reported by or detected at each asset 105) to determine (at 456) whether there are opportunities to improve the deployment of the IoT system. If a better deployment or deployment configuration is determined, the management system can initiate a redeployment 458. In some cases, the redeployment 458 (as with other healing and optimization tasks) can be performed to preempt an issue forecast from patterns identified in the global (or local) model. Redeployment 458, in some cases, can involve redeploying the same collection of assets (including asset 105), but with an adjustment to the configuration of the overall system (or one or more devices) as determined by the management system 150 from the global model. Redeployment 458 of a particular asset can include the management system 150 forcing a reset and/or restart of the particular asset (e.g., based on the global model). In other cases, redeployment 458 can involve replacing one or more of the assets (e.g., the asset whose operating status prompted the redeployment 458 task) with another asset from the same taxonomy. In some cases, the replacement asset may be a different device than the replaced asset within the taxonomy. In other cases, if no replacement device is available (e.g., as only one asset instance of a taxonomy has been discovered for use in the environment), the management system 150 can attempt to nonetheless redeploy the system with the troubled asset.

Figure 5A:
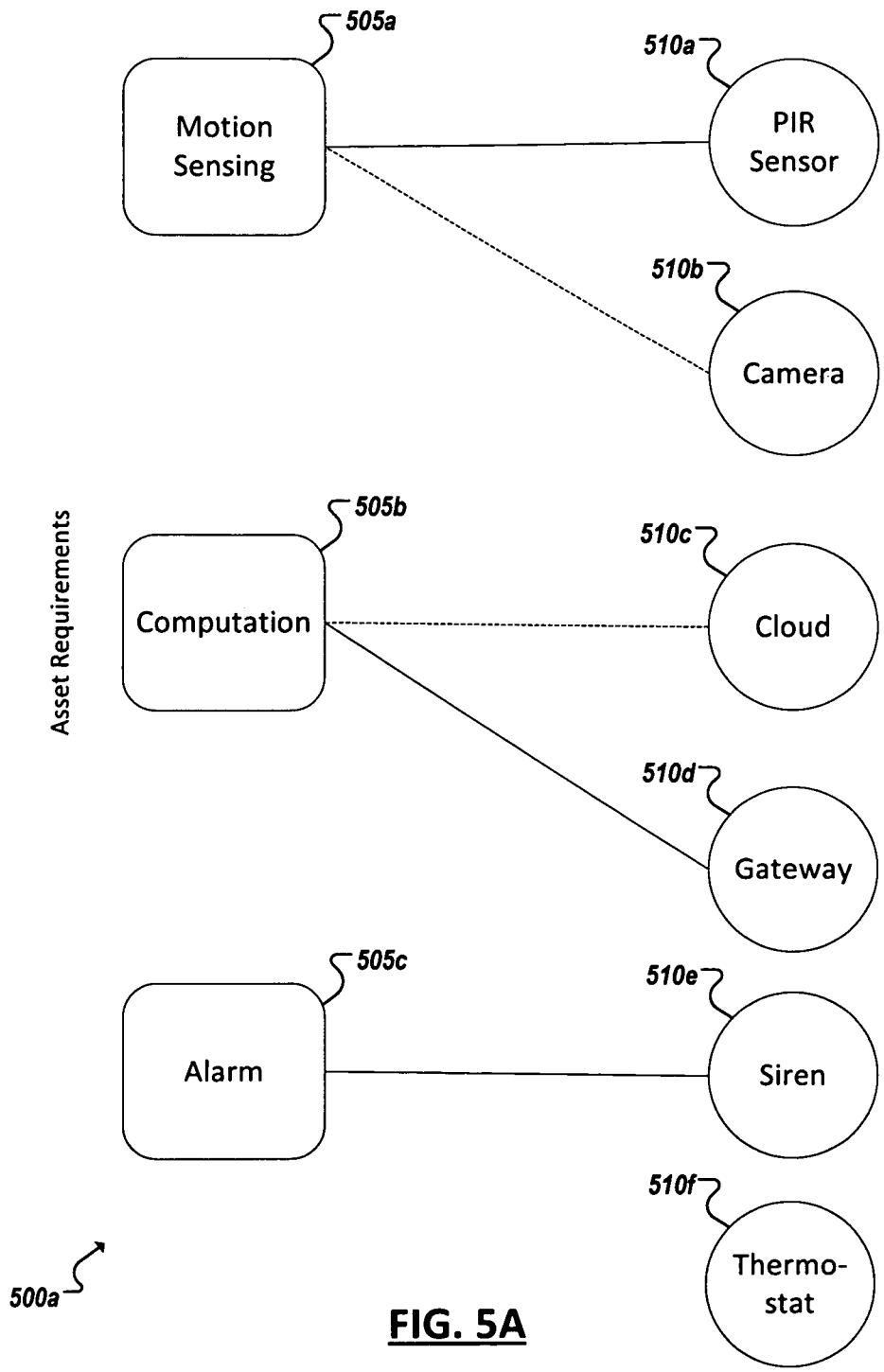
FIG. 5A is a simplified block diagram illustrating an example of asset abstraction and binding.

As noted above, asset abstraction can enhance the resiliency and flexibility of IoT system deployments. For instance, FIG. 5A shows a simplified block diagram 500*a* representing a simplified example of asset abstraction. A variety of different taxonomies can be defined at varying levels. For instance, a sensor taxonomy can be a parent to a multitude of specific sensor-type taxonomies (e.g., child taxonomies for light sensing, motion sensing, temperature sensing, liquid sensing, noise sensing, etc.), among other examples. In the example of FIG. 5A, an IoT application has been defined to include three asset requirements, represented by taxonomies Motion Sensing 505*a*, Computation 505*b*, and Alarm 505*c*. During asset discovery, a variety of assets (e.g., 510*a-f*) can be identified, or discovered, as usable by the application (e.g., based on the assets meeting one or more defined discovery criteria). One or more corresponding taxonomies, or abstractions, can be identified (e.g., by an IoT management system) for each of the assets 510*a-f*. Some of the abstractions may not have relevance to the asset requirements and function of the application, such as an abstraction (e.g., Temperature Sensor and/or HVAC Actuator) determined for thermostat device 510*f*. Such discovered assets can be ignored. Other asset abstractions may match the abstractions (e.g., 505*a-c*) designated in the IoT application as asset requirements of the application. Indeed, more than one discovered asset may be fit one of the asset requirements. For instance, in the example of FIG. 5A, a PIR sensor 510*a* and camera 510*b* are each identified as instances of a motion sensing asset taxonomy 505*a*. Similarly, a cloud-based computing resource 510*c* and network gateway 510*d* are identified as instances of a computation asset taxonomy 505*b*. In other instances, there may be just a single discovered device satisfying an application asset requirement (e.g., siren 510*e* of the alarm taxonomy 505*c*), among other examples.

Conventionally, IoT and wireless sensor network (WSN) applications have been developed to intricately define dataflow among a determined set of physical devices, which involves device-level discovery in development time to obtain and hardcode the corresponding device identifiers and characteristics. By utilizing asset abstraction, development can be facilitated to allow the devices to be discovered and determined at runtime (e.g., at launch of the application), additionally allowing the application to be portable between systems and taxonomy instances. Further, development can be expedited by allowing developers to merely specify asset requirements (e.g., 505*a-c*), without the necessity to understand radio protocol, network topology, and other technical features.

In one example, taxonomies for asset abstraction can involve such parent taxonomies as sensing assets (e.g., light, presence, temperature sensors, etc.), actuation (e.g., light, HVAC, machine controllers, etc.), power (e.g., battery-powered, landline-powered, solar-powered, etc.), storage (e.g., SD, SSD, cloud storage, etc.), computation (e.g., microcontroller (MCU), central processing unit (CPU), graphical processing (GPU), cloud, etc.), and communication (e.g., Bluetooth, ZigBee, WiFi, Ethernet, etc.), among other potential examples. Discovering which devices possess which capabilities (and belong to which taxonomies) can be performed using varied approaches. For instance, some functions (e.g., sensing, actuating, communication) may be obtained directly from signals received from the device by the system management system, while other features (e.g., power, storage, computation) may be obtained through deeper queries (utilizing resources on top of the operating system of the queried device), among other examples.

Asset binding can be applied to determine which discovered assets (fitting the asset requirements (abstractions) defined for an application) are to actually be deployed by the management system. Criteria can be defined at development time, immediately before or at runtime by the application's user, which management system can consult to perform the binding. For instance, as shown in FIG. 5A, according to the criteria set forth for the application (or for a particular session using the application), one of multiple matching assets for a required taxonomy can be selected. For instance, between PIR sensor 510*a* and camera 510*b*, corresponding criteria (e.g., criteria to be applied generally across all taxonomies of the application and/or taxonomies specific to the motion sensing taxonomy 505*a*) can result in PIR sensor 510*a* being selected to be deployed (as designated by the solid line) to satisfy the motion sensing asset requirement 505*a* of the application. The unselected asset (e.g., 510*b*, as shown by the dashed connector line) can be left un-deployed. Similarly, criteria can be assessed to determine that gateway 510*d* is the better candidate between it and cloud resource 510*c* to satisfy the application's computation requirement 505*b*. For asset requirements (e.g., 505*c*) where only a single discovered instance (e.g., 510*e*) of the asset taxonomy is discovered, asset binding is straightforward. Those discovered devices (e.g., 510*a*, 510*d*, 510*e*) that have been selected, or bound, can then be automatically provisioned with resources from or configured by the management system to deploy (or re-deploy) the application. Unselected assets (e.g., 510*b*, 510*c*, 510*f*) may remain in the environment, but are unused in the application. In some instances, unselected assets can be identified as alternate asset selections (e.g., in the event of a failure of one of the selected assets), allowing for swift replacement of the asset during redeployments initiated by the management system (e.g., based on its global model).

Deployment and redeployment of an IoT system can also include asset discovery. Through asset discovery, the scope of available devices can be constrained based on discovery conditions or criteria, such as conditions relating to device proximity, semantic location (e.g., presence within a particular room, building, or defined area), movement state, movement direction, security, permissions, among many other potential (and configurable) conditions. The benefits of such targeted discovery can trickle down to asset binding, as unchecked discovery may return many possible bindings, especially in large scale deployment. For example, in a smart factory, the action of "deploying predictive maintenance" may be ambiguous as there may be hundreds of sensors, motors, alarms, etc. in a factory facility. Asset discovery, in some implementations, takes as input a policy or user input from which a set of discovery criteria can be identified. Upon detecting the universe of assets with which the application could potentially operate, the criteria can be used to constrain the set, in some cases, providing a resulting ordered list of available assets, from which binding can be determined.

Figure 5B:
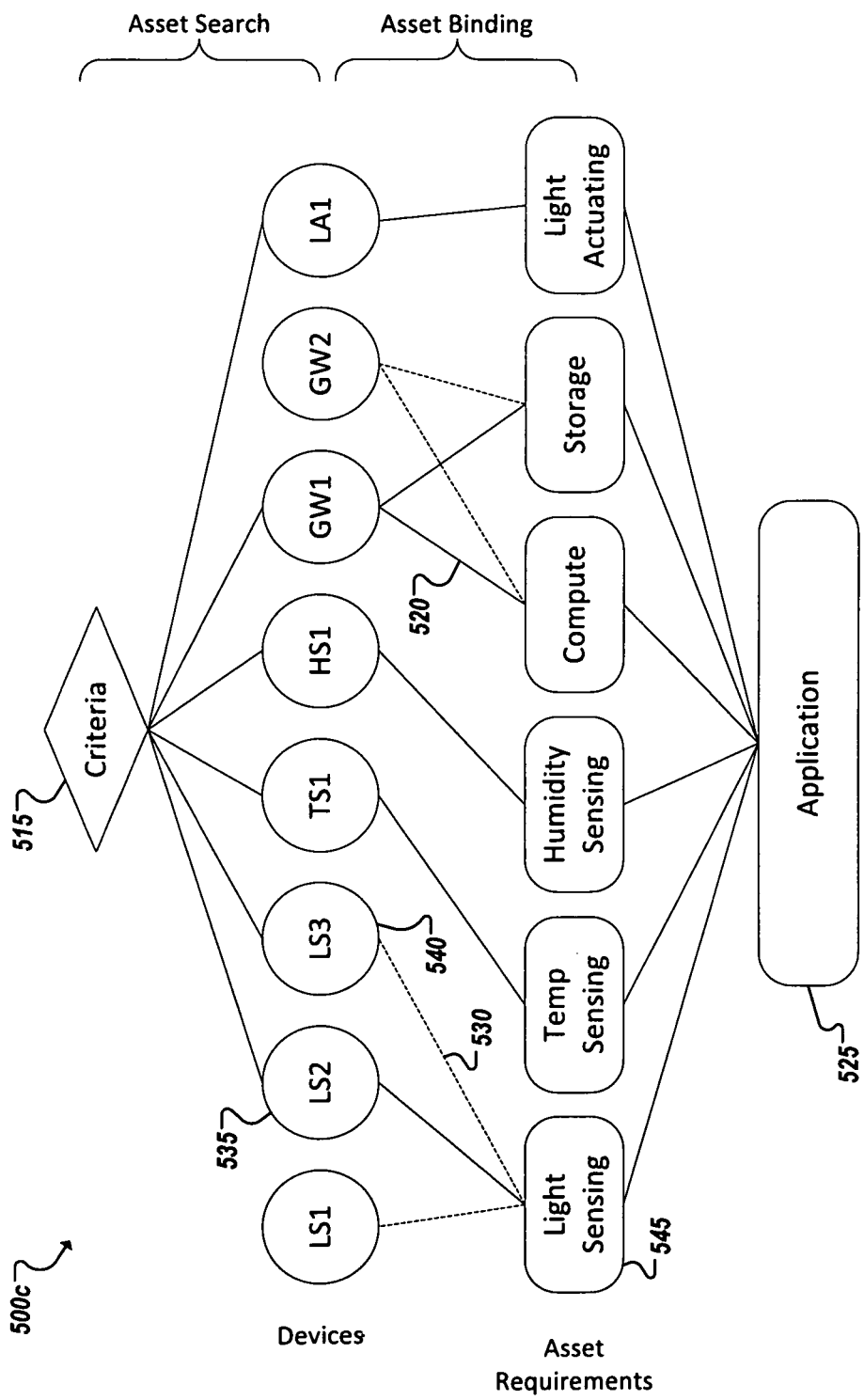
FIG. 5B is a simplified block diagram illustrating an example of asset abstraction and binding using a discovered set of assets.

Turning to the example of FIG. 5B, discovery criteria 515 can be identified for an application and applied to discover a set of available assets. For instance, based on the defined criteria 515 in this example, the output of discovery leads to the codomain of a subset of devices in the environment. For instance, among the assets capable of being accessed for use in a deployment, a particular light sensor asset (LS1) and gateway asset (GW2) may be determined to fail to meet the discovery criteria 515. The remaining assets, light sensors LS2 and LS3, temperature sensor TS1, humidity sensor HS1, gateway GW1, and light actuator LA1 may be considered for binding. Further, one or more corresponding taxonomies can be mapped to each of the discovered devices. For instance, taxonomies corresponding to asset requirements of the IoT application can be identified and assets matching one of these designated taxonomies can be identified. For instance, LS2 and LS3 can be mapped to a light sensing taxonomy, humidity sensor HS1 to a humidity sensing taxonomy, and so on. Based on the set of defined discovery criteria (e.g., 515), asset discovery can attempt to reduce the total collection of identified assets to a best solution. Additionally, determining the set of discovered assets for binding consideration can incorporate determining a minimum set of discovered devices, based on the asset requirements of the application. For instance, a minimum set can be selected during discovery such that at least one asset of each required taxonomy is present in the set, if possible.

As noted above, additional criteria can be defined and applied during asset binding to select between multiple instances of an application-required asset taxonomy. During binding, where the set of discovered assets include more than one instance of a particular required asset taxonomy (e.g., as with assets LS2 (535) and LS3 (540) in asset taxonomy Light Sensing), criteria can be applied to automatically select the asset that is the better fit for deployment within the IoT system governed, controlled, or otherwise supported by the application 525. Further, as illustrated in FIG. 5B, it is possible for a single asset instance (e.g., GW1) to both belong to two or more taxonomies and to be selected for binding to the application for two or more corresponding asset requirements (e.g., Compute and Storage), as shown. Indeed, a binding criterion can be defined to favor opportunities where multiple asset requirements of the application can be facilitated through a single asset, among other examples.

Figure 5C:
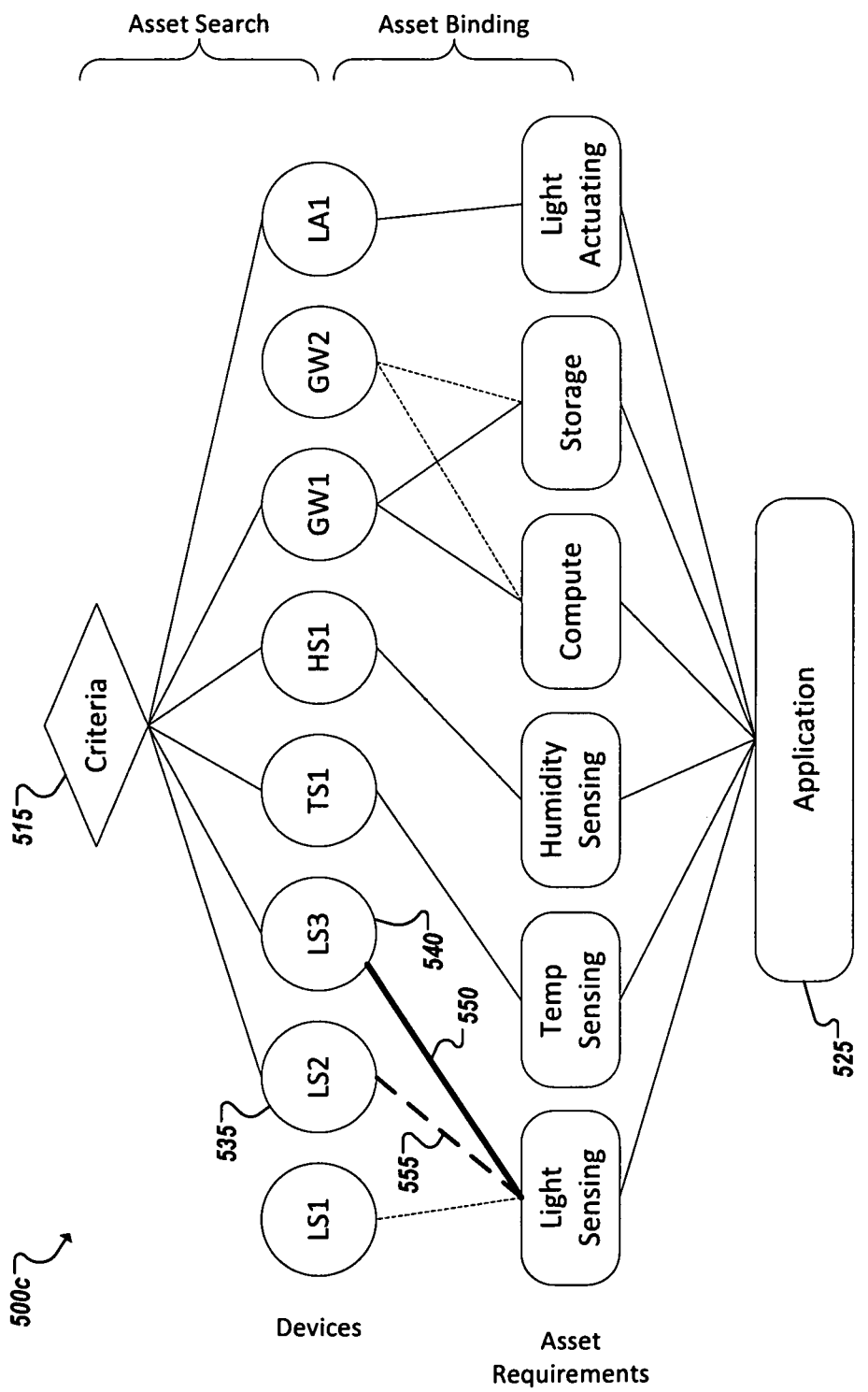
FIG. 5C is a simplified block diagram illustrating an example redeployment of an example IoT system.

As represented generally in FIG. 5C, asset discovery can provide the first level for confining the scope of an asset-to-application asset requirement mapping. A user or developer can specify (in some cases, immediately prior to runtime) the asset requirements for a particular application, and an environment can be assessed to determine whether assets are available to satisfy these asset requirements. Further, the management system can automatically deploy and provision discovered assets to implement the application, should the requisite combination of assets be found in the environment. Additionally, the management system can automatically apply setting values across the deployed assets in accordance with a configuration defined by a user associated with the application. However, if no instances of one or more of the asset requirements (required taxonomies) are discovered, the application may be determined to be undeployable within the environment. In such cases, a system manager utility can generate an alert for a user to identify the shortage of requested taxonomy instances, including identifying those taxonomies for which no asset instance was discovered within the environment, among other examples.

As detailed herein, once an IoT system has been successfully deployed within an environment (e.g., in connection with an application), system resiliency logic provided on one or more of the deployed devices and the management system can collect data describing performance of the component asset in the system. In some cases, a local and/or global model can be consulted, in connection with reported or detected operating status of one or more of the deployed assets to determine that a redeployment of the IoT system is warranted. As represented in the example of FIG. 5C, in the system exemplified in FIG. 5B an issue may be detected or forecast by the management system based on modeling information in the global model. The management system may determine that a redeployment should be performed, during runtime, to swap out light sensor LS2 with another asset. For instance, an outage may be detected affecting operation of the LS2 and after failed attempts to utilize self-healing logic local to LS2, the management system can intervene to redeploy the IoT system (or M2M network).

Redeploying the system can involve a process similar to the initial deployment of the system. In one example, one or more of the deployed assets can be identified for replacement. Asset discovery can be repeated to determine if the same set of discovered assets remain in the environment or if assets have entered (been added to) or exited (been removed from) the environment. The management system can determine whether other assets are discovered in the same taxonomy as the asset to be replaced. In some cases, discovery of viable replacement assets can be performed as a preceding step to initiating the redeployment. Upon discovering other assets in the relevant taxonomies, the management system can apply binding criteria to select the replacement assets. In some cases, different binding criteria can be applied in a redeployment. For instance, a redeployment may emphasize a reconfiguration of the system according to certain characteristics (e.g., defined in the global model) and binding criteria can be dynamically selected and employed to select those replacement assets that will best realize the desired reconfiguration of the system.

Continuing with the example of FIG. 5C, a redeployment can be launched by a management system causing LS2 to be replaced by an alternate light sensor, LS3. The resulting redeployed system (represented by the changes to lines 550, 555 indicating which asset is deployed and which is not (respectively)) can then continue operations, enabling flexible resilience and reliability of the system even when one or more deployed assets fail or underperform. Indeed, while the example of FIG. 5C involves replacing an asset having an outage, other redeployments can be motivated by an identified opportunity (based on global model intelligence) to improve or optimize operation of the system, by replacing or reconfiguring one or more of the assets to realize the attempted optimization, among other examples.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figures 6A, 6B:
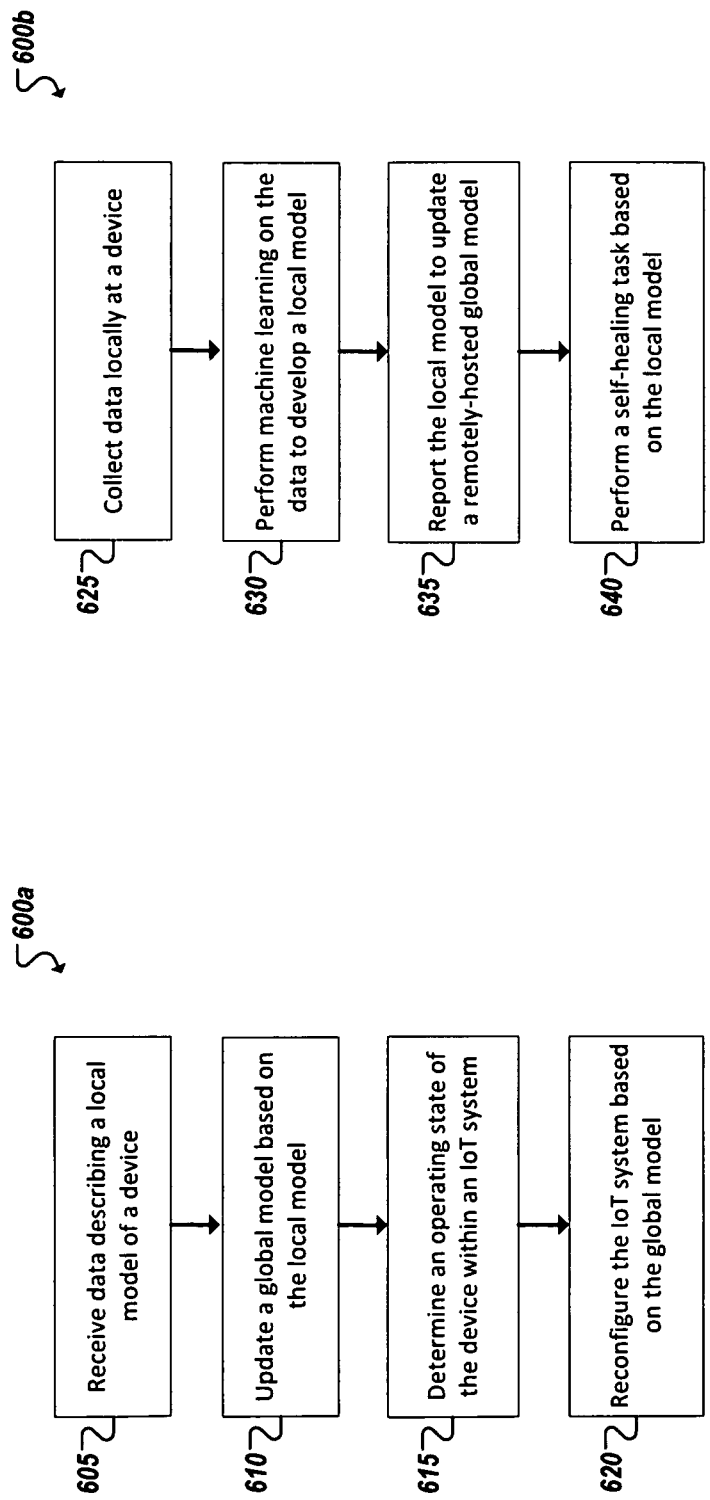
FIGS. 6A-6B are flowcharts illustrating example techniques for managing an IoT system or other machine-to-machine network.

FIGS. 6A-6B are simplified flowcharts 600*a-b* illustrating example techniques for managing an IoT system or other machine-to-machine network. For instance, in FIG. 6A, data can be received 605 from a particular remote device (i.e., an IoT asset) describing a local model maintained at the remote device and modeling the device. The local model can be developed from locally-collected data at the device to describe performance characteristics of the device as it participates in machine-to-machine networks (e.g., IoT systems). A global model can be updated 610 to reflect findings in the local model. The global model can be maintained and developed through machine learning logic assessing the local models of potentially hundreds or thousands of different IoT assets, including IoT gateways. An operating state of the device within an IoT system can be determined 615. The operating state can be determined 615 for instance, from data reported by the device indicating the state. In other cases, a management system can identify the operating state (e.g., an outage or other error) from monitoring of the IoT system. In some cases, the management system may only recognize that the IoT as a whole is performing sub-par (without identifying specifically that a particular device is the cause). In response to such events, the management system can consult the global model to derive conclusions regarding the state of the IoT system, as well as determine potential remedies for subpar performance of the IoT system. For instance, the management system can reconfigure 620 the IoT system in response to a determined operating state of the device or a collection of devices in the IoT system. Reconfiguring the IoT system can include changing configuration parameters or setting of one or more devices in the system and redeploying the assets or redeploying the IoT system with a different set of assets (e.g., replacing one or more underperforming assets), among other examples.

Turning to FIG. 6B, an IoT device can collect 625 data locally that describes attributes of the IoT device's performance. Machine learning can be performed 630 locally at the device using this data to develop a local model modeling the operation of the IoT device, and in particular, operation of the IoT devices when deployed in IoT systems. This local model can be periodically reported 635 to a management system that hosts a global model that models a plurality of different devices and asset taxonomies, as well as various IoT systems involving various combinations of devices. The global model can potentially model the universe of devices, taxonomies, device combinations (e.g., IoT system deployments) that a particular management system is likely to or might possibly manage. The management system can leverage a distributed network of machine learning modules (provisioned on multiple IoT assets) to continuously update the global model based on the continuously improving or iterating local models based on locally-collected telemetry data. Further, the global model can be used to push updates to the local models (e.g., based on updates of the global model). The local model can be used by self-healing logic local to the device to perform 640 self-healing tasks, such as preemptive restarts and resets, reconfiguration of device parameters and settings, among other example tasks.

Figure 7:
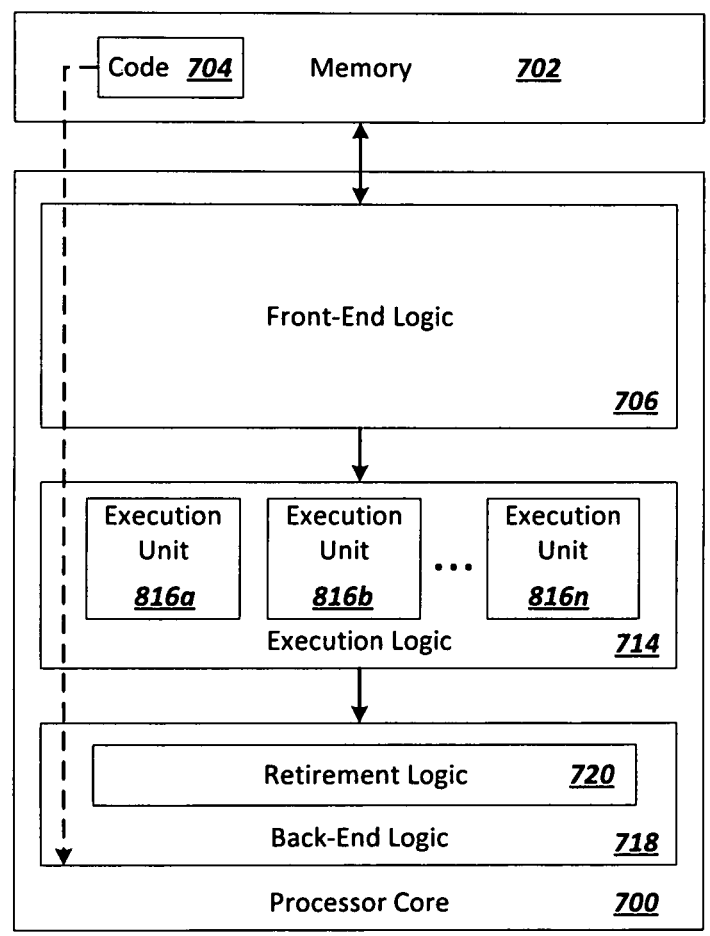
FIG. 7 is a block diagram of an exemplary processor in accordance with one embodiment.
Figure 8:
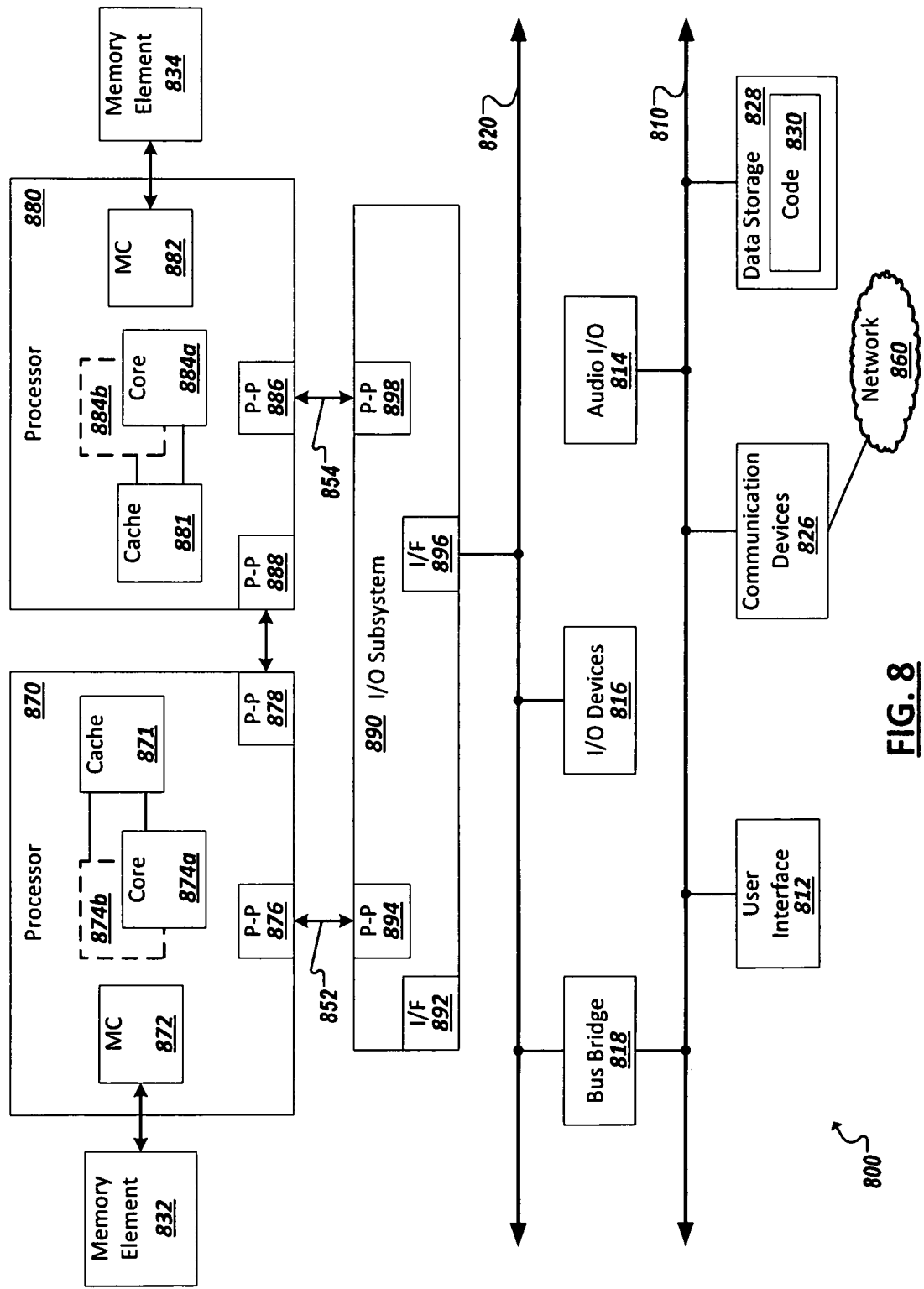
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, apparatus, and a machine readable storage medium with stored instructions executable to receive data describing a local model of a first device generated by the first device based on sensor readings at the first device, update a global model hosted remote from the first device based on the local model and modeling devices in a plurality of different asset taxonomies, determine a particular operating state affecting one or more of a set of devices deployed in a particular machine-to-machine network, where the set of devices includes the first device, and reconfigure the particular machine-to-machine network based on the global model.

In one example, reconfiguration of the particular machine-to-machine network includes replacing the first device with a different second device.

In one example, each of the first and second devices are members of a common one of the plurality of asset taxonomies and the second device is selected to replace the first device based on the common asset taxonomy.

In one example, reconfiguration of the particular machine-to-machine network includes changing settings of one or more devices in the machine-to-machine network In one example, the reconfiguration is responsive to a failure of the first device to successfully self-heal.

In one example, synchronization data is sent to the first device to indicate a particular update to the global model and cause an update of the local model at the first device.

In one example, the particular update is based on receipt of data describing a local model of another device.

In one example, the other device is not deployed in the particular machine-to-machine network.

In one example, a plurality of devices are discovered within an environment including the set of devices, an association between a respective one of the plurality of asset taxonomies and each of the plurality of devices is determined, the set of devices is selected from the plurality of devices based on a set of defined criteria, and deployment of the set of devices as the particular machine-to-machine network is automated.

One or more embodiments may provide an apparatus that includes a processor, a memory element, a communication module to participate in a particular machine-to-machine network, one or more sensors to monitor attributes of operation of the apparatus while participating in the particular machine-to-machine network, a local model manager to assess information generated by the one or more sensors describing the attributes of operation of the apparatus to generate a local model stored locally using the memory element and models the apparatus, and a configuration agent to perform configuration tasks at the apparatus based on the local model.

In one example, the local model is based on information of a remotely hosted global model modeling a plurality of devices.

In one example, the apparatus further includes a receiver to receive data indicating an update to the global model, where local model manager uses the data to modify the local model based on the update to the global model.

In one example, the apparatus further includes a transmitter to send a copy of the local model to a system hosting the global model to incorporate information from the local model in the global model.

In one example, the apparatus further includes at least one of an actuator to interact with an environment corresponding to the particular machine-to-machine network and a sensor to detect attributes of the environment.

In one example, the particular machine-to-machine network includes an Internet of Things system launched from a remotely-hosted software application.

In one example, the configuration tasks include restarting the apparatus and resetting the apparatus.

In one example, the configuration tasks include reconfiguration one or more settings of the apparatus.

In one example, the settings are reconfigured to a last known good configuration, based on the local model.

In one example, at least a portion of the configuration tasks are to be performed to preempt an error predicted by machine learning logic of the apparatus based on the local model.

One or more embodiments may provide a method, a system, apparatus, and a machine readable storage medium with stored instructions executable to collect data, using one or more sensors, describing attributes of operation of a particular device within a particular machine-to-machine network including a plurality of devices, perform machine learning using the data to determine one or more updates to a local model hosted at the particular device and modeling the particular device, modify the local model based on the updates, and perform one or more self-healing tasks at the particular based on the collected data and the local model.

One or more embodiments may provide a system including at least one processor, at least one memory element, and a management system. The management system can be executable to receive data describing a local model of a first device generated by the first device based on sensor readings at the first device, update a global model hosted remote from the first device based on the local model and modeling devices in a plurality of different asset taxonomies, receive an indication of a particular operating state affecting one or more of a set of devices deployed in a particular machine-to-machine network, where the set of devices includes the first device, and reconfigure the particular machine-to-machine network based on the global model.

In one example, the system includes a host device hosting an application administrator to instruct the management system to deploy the particular machine-to-machine network. In one example, the system includes the set of devices.

In one example, the application is coded to reference the set of devices according to asset abstractions including the plurality of asset taxonomies.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one machine accessible storage medium having code stored thereon, the code when executed on a machine, causes the machine to:
   receive data describing a local model of a first device, wherein the local model is generated by the first device based on sensor readings at the first device, and the sensor readings describe attributes of operation of the first device;
   update a global model hosted remote from the first device based on the local model, wherein the global model is to model devices in a plurality of different asset taxonomies, the first device is associated with a particular one of the plurality of different asset taxonomies, and a portion of the global model associated with the particular asset taxonomy is updated based on the local model;
   determine a particular operating state affecting one or more of a set of devices deployed in a particular machine-to-machine network, wherein the set of devices comprises the first device; and
   reconfigure the particular machine-to-machine network based on the global model.

2. The storage medium of claim 1, wherein reconfiguration of the particular machine-to-machine network comprises replacing the first device with a different second device.

3. The storage medium of claim 2, wherein the first and second devices are both members of the particular asset taxonomy and the second device is selected to replace the first device based on the common asset taxonomy.

4. The storage medium of claim 1, wherein reconfiguration of the particular machine-to-machine network comprises changing settings of one or more devices in the machine-to-machine network.

5. The storage medium of claim 1, wherein reconfiguration of the particular machine-to-machine network is responsive to a failure of the first device to successfully self-heal using information in the local model.

6. The storage medium of claim 1, wherein the instructions, when executed, further cause the machine to send synchronization data to the first device to indicate a particular update to the global model and cause an update of the local model at the first device.

7. The storage medium of claim 6, wherein the particular update is based on receipt of data describing a local model of another device.

8. The storage medium of claim 7, wherein the other device is not deployed in the particular machine-to-machine network.

9. The storage medium of claim 1, wherein the instructions, when executed, further cause the machine to:
   discover a plurality of devices within an environment, wherein the set of devices are included in the plurality of devices;
   determine an association between a respective one of the plurality of asset taxonomies and each of the plurality of devices;
   select the set of devices from the plurality of devices based on a set of defined criteria; and
   automate deployment of the set of devices as the particular machine-to-machine network.

10. An apparatus comprising:
    a processor;
    a memory element;
    a communication module to participate in a particular machine-to-machine network;
    one or more sensors to monitor attributes of operation of the apparatus while participating in the particular machine-to-machine network;
    a local model manager to:
      assess information generated by the one or more sensors describing the attributes of operation of the apparatus to generate a local model, wherein the local model is stored locally using the memory element and models the apparatus; and
      share information from the local model with another system using the communication module, wherein the other system hosts a global model to model operation of a plurality of different asset taxonomies, each one of the plurality of different asset taxonomies is associated with a respective class of device providing respective functional capabilities, and the local model is associated with a particular one of the plurality of different asset taxonomies; and
    a configuration agent to perform configuration tasks at the apparatus based on the local model.

11. The apparatus of claim 10, wherein the local model is based on information of the global model.

12. The apparatus of claim 11, further comprising a receiver to receive data indicating an update to the global model, wherein local model manager uses the data to modify the local model based on the update to the global model.

13. The apparatus of claim 11, further comprising a transmitter to send a copy of the local model to a system hosting the global model to incorporate information from the local model in the global model.

14. The apparatus of claim 10, further comprising at least one of an actuator to interact with an environment corresponding to the particular machine-to-machine network and a sensor to detect attributes of the environment.

15. The apparatus of claim 10, wherein the particular machine-to-machine network comprises an Internet of Things system launched from a remotely-hosted software application.

16. The apparatus of claim 10, wherein the configuration tasks comprise restarting the apparatus and resetting the apparatus.

17. The apparatus of claim 10, wherein the configuration tasks comprise reconfiguration one or more settings of the apparatus.

18. The apparatus of claim 17, wherein the settings are reconfigured to a last known good configuration, based on the local model.

19. The apparatus of claim 10, wherein at least a portion of the configuration tasks are to be performed to preempt an error predicted by machine learning logic of the apparatus based on the local model.

20. A system comprising:
   at least one processor;
   at least one memory element to store a global model, wherein the global model is to model devices in a plurality of different asset taxonomies;
   a management system, executable by the processor to:
      receive data describing a local model of a first device, wherein the local model is generated by the first device based on sensor readings at the first device, and the sensor readings describe attributes of operation of the first device;
      update the global model based on the local model, wherein the first device is associated with a particular one of the plurality of different asset taxonomies, and a portion of the global model associated with the particular asset taxonomy is updated based on the local model;
      receive an indication of a particular operating state affecting one or more of a set of devices deployed in a particular machine-to-machine network, wherein the set of devices comprises the first device; and
      reconfigure the particular machine-to-machine network based on the global model.

21. The system of claim 20, further comprising a host device hosting an application administrator to instruct the management system to deploy the particular machine-to-machine network.

22. The system of claim 21, wherein the application is coded to reference the set of devices according to asset abstractions comprising the plurality of asset taxonomies.

23. The system of claim 20, further comprising the set of devices.

* * * * *